United States Patent
Cilio

(10) Patent No.: US 8,427,120 B1
(45) Date of Patent: Apr. 23, 2013

(54) COUPLED INDUCTOR OUTPUT FILTER

(75) Inventor: Edgar Cilio, Farmington, AR (US)

(73) Assignee: Arkansas Power Electronics International, Inc., Fayetteville, AR (US)

( * ) Notice: Subject to any disclaimer, the term of this patent is extended or adjusted under 35 U.S.C. 154(b) by 186 days.

(21) Appl. No.: 13/068,229

(22) Filed: May 5, 2011

Related U.S. Application Data

(60) Provisional application No. 61/343,882, filed on May 5, 2010.

(51) Int. Cl.
*G05F 1/40* (2006.01)

(52) U.S. Cl.
USPC .......................... 323/266; 323/222; 323/247

(58) Field of Classification Search ................. 323/222, 323/247, 266, 267, 328
See application file for complete search history.

(56) References Cited

U.S. PATENT DOCUMENTS

| | | | | |
|---|---|---|---|---|
| 4,703,409 | A | 10/1987 | Spreen | 363/45 |
| 5,321,348 | A * | 6/1994 | Vinciarelli et al. | 323/222 |
| 6,989,997 | B2 * | 1/2006 | Xu et al. | 363/16 |
| 7,317,305 | B1 | 1/2008 | Stratakos et al. | 323/282 |
| 7,449,867 | B2 | 11/2008 | Wu et al. | 323/247 |
| 7,498,783 | B2 | 3/2009 | Johnson | 323/282 |
| 8,035,361 | B2 * | 10/2011 | Duan et al. | 323/272 |
| 2002/0181262 | A1 * | 12/2002 | Wade | 363/125 |
| 2009/0179713 | A1 | 7/2009 | Zeng et al. | 333/176 |

* cited by examiner

*Primary Examiner* — Jessica Han

(74) *Attorney, Agent, or Firm* — Keisling & Pieper PLC; David B. Pieper

(57) ABSTRACT

The present invention is directed to a coupled inductor output filter to be used with DC/DC switched mode power supply topologies. This new output filter changes the inherent power sharing capability of most DC/DC converter topologies, enabling the overall converter to operate as a truly modular block with no inter-module communication required to accomplish power/current sharing on a multi-module configuration. The coupled-inductor output filter uses a split inductor, Lout1 and Lout2, a main output capacitor, Cout, and a DC blocking capacitor, CDC Block.

2 Claims, 14 Drawing Sheets

Coupled inductor output filter.

Coupled inductor output filter.

Two-module PIPO system

Current takeover phenomenon on measured on a two-module PIPO system

Output plane analysis of two conventional DC/DC PIPO connected modules

Traditional power output filter (top) and coupled inductor output filter (bottom).

Coupled inductor output filter simulation results for different load conditions.

Frequency response comparison of a coupled inductor output filter and standard output filter for Fo ≈ 2.5 kHz (critically damped).

Closed loop standalone operation providing 5.44A load.

PWM signals for closed loop standalone operation providing 5.44A load.

Standalone operation 500mA to 5.44A load transient response.

Standalone operation 5.44A to 500mA load transient response.

Two-module configuration schematic representation.

Steady state operation of MA and MB connected in parallel at the output with $V_{IN\,M1}=23V$ and $V_{IN\,M2}=20V$.

Steady state operation of MA and MB connected in parallel at the output with $V_{IN\,M1}=23V$ and $V_{IN\,M2}=32V$.

MA and MB automatic response to an addition of a new module (MB).

MA and MB automatic response to the loss of a module (MB).

COUPLED INDUCTOR OUTPUT FILTER

CROSS-REFERENCE TO RELATED APPLICATIONS

This application claims priority to and is a continuation in part of U.S. Provisional Application 61/343,882, filed May 5, 2010 by Edgar Cilio of Farmington, Ark. entitled Coupled inductor output filter.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document may contain material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention relates to improvements in DC/DC switched mode power supply topologies. More particularly, the invention relates to improvements particularly suited for multiple module topologies. In particular, the present invention relates specifically to a coupled inductor output filter allowing load sharing between multiple power supplies without inter-module feedback between the power supplies.

2. Description of the Known Art

As will be appreciated by those skilled in the art, power supply topologies are known in various forms. Patents disclosing information relevant to power supplies include: U.S. Pat. No. 4,703,409, issued to Spreen on Oct. 27, 1987 which is entitled Coupled power supply inductors for reduced ripple current; U.S. Pat. No. 7,317,305, issued to Stratakos et al. on Jan. 8, 2008 which is entitled Method and apparatus for multi-phase dc-dc converters using coupled inductors in discontinuous conduction mode; U.S. Pat. No. 7,449,867, issued to Wu et al. on Nov. 11, 2008 which is entitled Multi-phase buck converter with a plurality of coupled inductors; and U.S. Pat. No. 7,498,783, issued to Johnson on Mar. 3, 2009 which is entitled Extending the continuous mode of operation for a buck converter. Patents and/or applications relating to coupled inductors also include the basic electrical components of the present design as noted by United States Patent No. 2009/0179713 filed by Zeng et al. published on Jul. 16, 2009 entitled Low pass filter incorporating coupled inductors to enhance stop band attenuation. Each of these patents and applications is hereby expressly incorporated by reference in their entirety.

Increasing power density and efficiency, reducing size and weight, and introducing standardization of electronics systems are all goals of the DC/DC converter power electronics community. Standardized building block modules can decrease cost and deployment time while improving capability and reliability while enabling seamless scalability. The modular converter concept is an ideal solution to diminish time and expenses associated with the implementation of typical converters. However, there are several inherent and practical challenges when attempting to develop a truly modular system using DC/DC converters as power building blocks. Next, a brief discussion of the inherent load imbalance phenomenon encountered in paralleled DC/DC converters is presented.

Inherent Problems (Power Plane Analysis)

Two ideal voltage sources (i.e., zero internal impedance) connected in parallel will share current equally, if and only if their individual voltages are perfectly matched. On practical voltage sources such as DC/DC converters with closed control loops, small voltage differences will allow for one of the sources (i.e., DC/DC converter) to "take over" or deliver most of the system current. FIG. 2 shows a two, parallel-input, parallel-output (PIPO) arrangement.

FIG. 3 is an oscilloscope capture of the output voltage (Vout) and the individual output currents of each module (10 and 11). In this particular case, module M0 is providing virtually all the current to the load while M1 is not outputting current.

The topologically inherent power sharing problem can be explained with the output power plane analysis. The output power plane is the graphical representation of the output current versus the output voltage of a particular converter [1].

FIG. 4 is an idealized power plane representation of the system in FIG. 2. Vp is the overall system operating voltage and Vout0 and Vout1 are the characteristic standalone output voltages of M0 and M1 respectively. Good voltage converters act as a voltage source with a small output impedance (i.e., the negative reciprocal of the slope of the lines seen in FIG. 4). The difference in output voltages originates from the intrinsic component differences of each module. The converters can be very similar, but they will never be exactly alike. This means that in any multi-module PIPO configured system there is always one converter that operates at a slightly higher output voltage than the others. This fact is important in understanding the effects of traditional proportional integral (PI) control loops found in most DC/DC converters.

As shown in FIG. 4, the module that operates at a slightly higher output voltage will provide all the current. This is derived from the small output impedance characteristic of a DC/DC converter operating under output voltage closed loop condition. In general the control PI loop under steady-state conditions performs small corrections in order to minimize the steady state error. This is the desired behavior for a standalone module. However, when two modules are PIPO connected, this typical behavior is counteractive to achieving even current sharing.

Literature involving prior art systems also includes Glaser, J. S.; Witulski, A. F.; "Output plane analysis of load-sharing in multiple-module converter systems" Power Electronics, IEEE Transactions on Volume 9, Issue 1, January 1994 Page (s):43-50 which indicates that discontinuous conduction mode converters (i.e., the output filter inductor current is depleted during each switching cycle) offer a favorable output impedance behavior for parallel operation. However, this output impedance behavior is only applicable for a limited range of output current. There is a maximum load current at which the converter leaves the discontinuous conduction mode and enters continuous conduction mode. In order to overcome this problem, a new power filter topology with inherent power sharing capabilities has been developed.

From these prior references it may be seen that these prior art patents are very limited in their teaching and utilization, and an improved filter topology is needed to overcome these limitations.

SUMMARY OF THE INVENTION

The present invention is directed to novel coupled inductor output filter to be used with most DC/DC switched mode power supply topologies. This new output filter changes the inherent power sharing capability of most DC/DC converter topologies, enabling the overall converter to operate as a truly modular block. Truly modular operation means that there is no inter-module communication required to accomplish power/current sharing on a multi-module configuration. The coupled-inductor output filter uses a split inductor, Lout1 and Lout2, a main output capacitor, COUT, and a DC blocking capacitor, CDC Block.

This new output filter topology offers power-sharing output impedances similar to those observed in discontinuous conduction mode converters. But unlike traditional discontinuous conduction mode converters, this new output filter topology exhibits favorable, linear, predictable power sharing capabilities for all loads. The coupled-inductor output filter possesses characteristics critical to enabling the parallel operation of DC/DC converters.

These and other objects and advantages of the present invention, along with features of novelty appurtenant thereto, will appear or become apparent by reviewing the following detailed description of the invention.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE INVENTION

Figure 1:
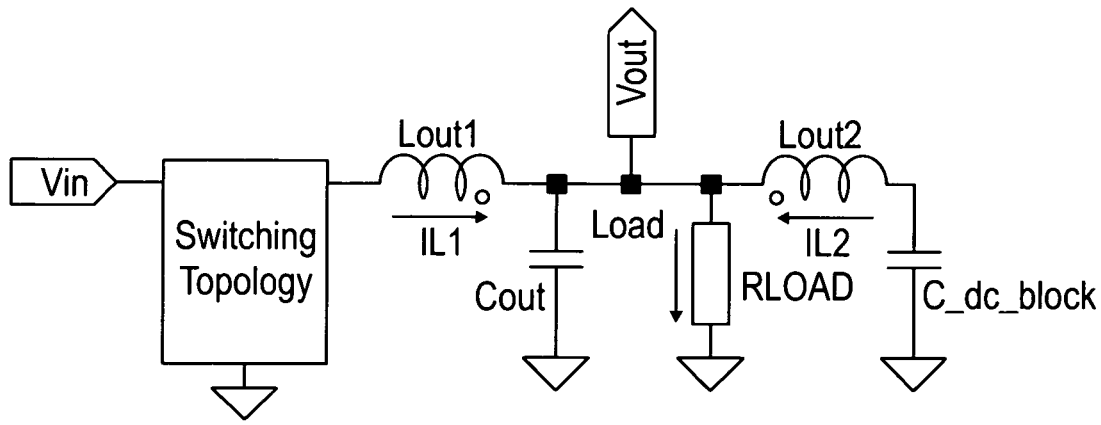
FIG. 1 is a schematic view of a coupled inductor output filter of the present invention.
Figure 2:
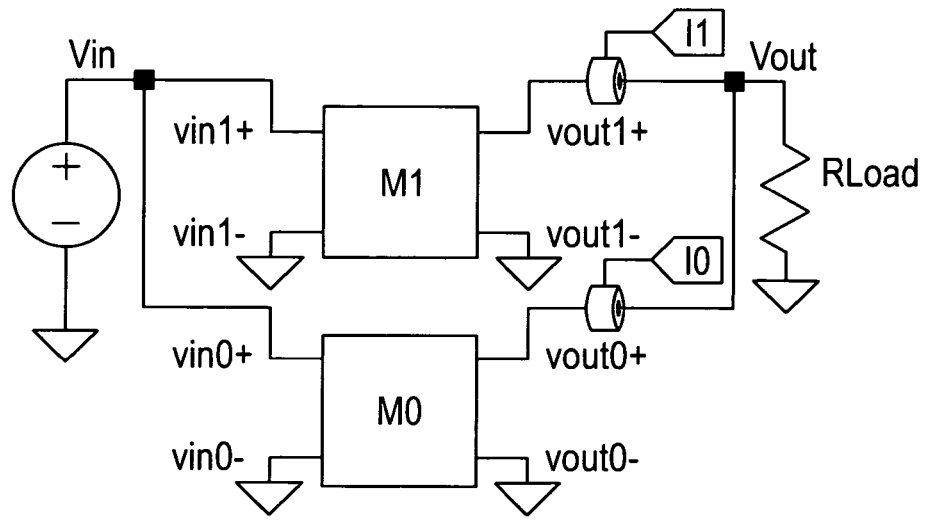
FIG. 2 is a schematic view of a prior art two-module PIPO system
Figure 3:
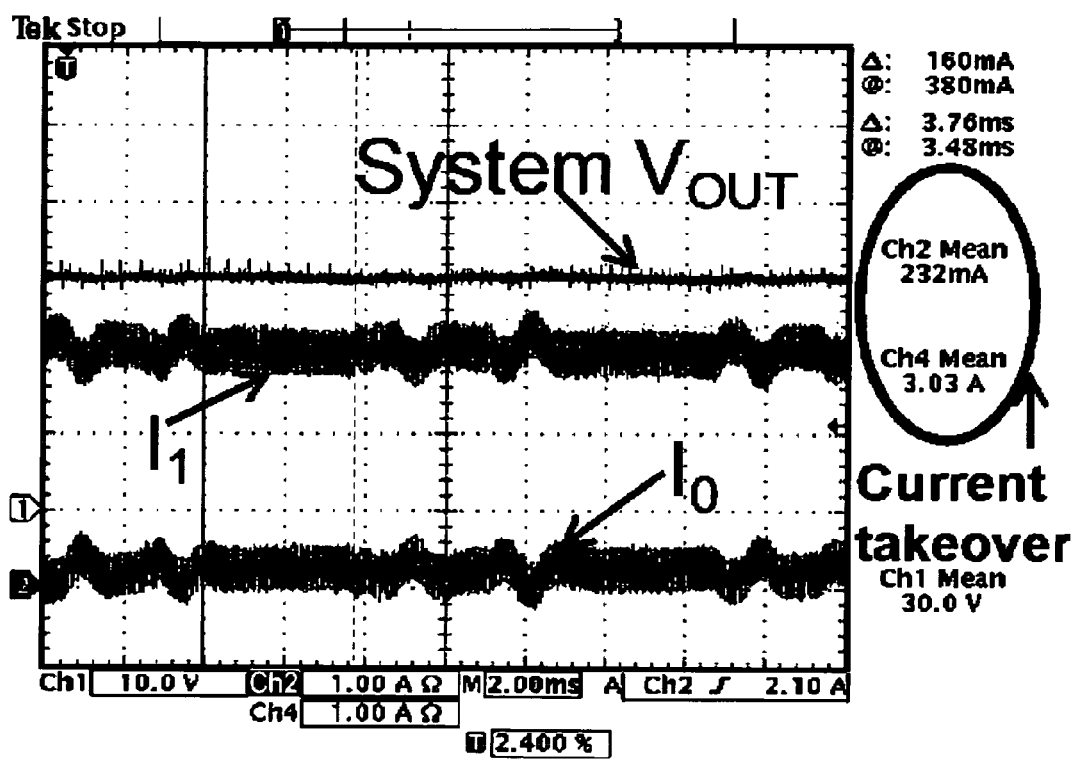
FIG. 3 is a graph of prior art current takeover phenomenon on measured on a two-module PIPO system.
Figure 4:
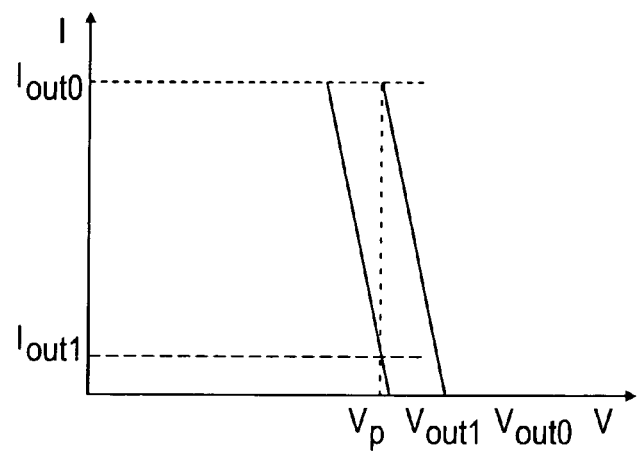
FIG. 4 is a graph of the output plane analysis of two prior art conventional DC/DC PIPO connected modules.
Figure 5:
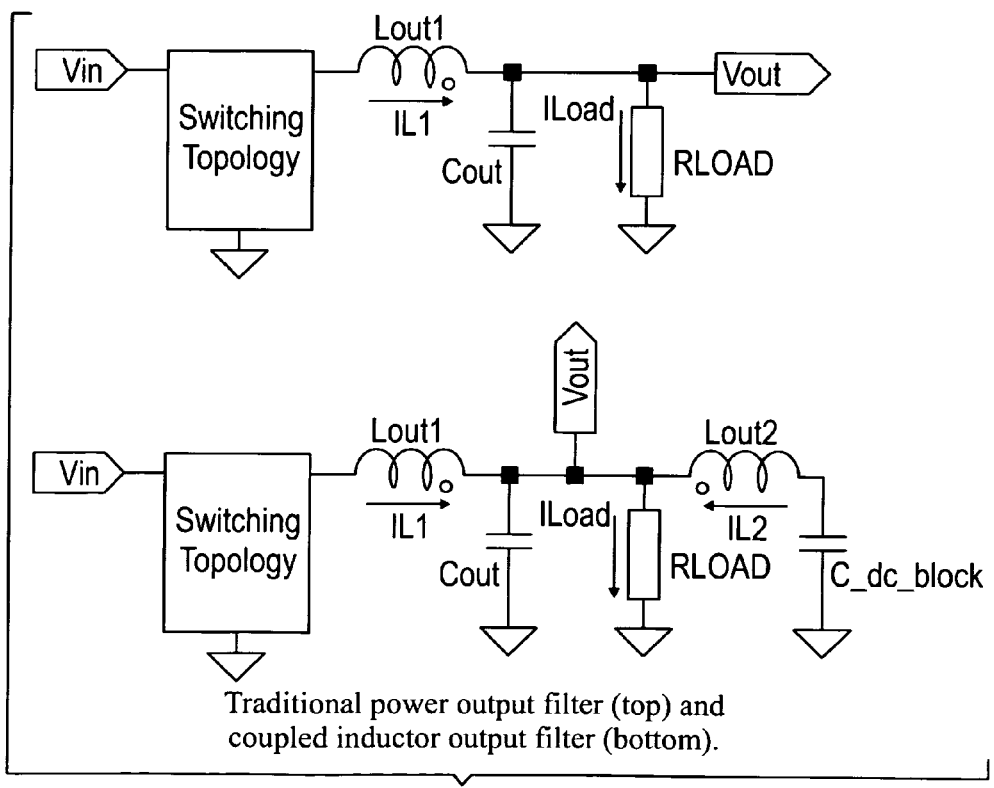
FIG. 5 is a schematic comparison of a traditional prior art power output filter (top) and the present invention's coupled inductor output filter (bottom).

The preferred embodiment of the present invention is directed to a new coupled inductor filter topology. FIG. 5 shows a traditional output filter (top) and the new coupled-inductor output filter (bottom). Notice that the implementation of this new filter is independent of the switching topology chosen. The coupled-inductor output filter uses a split inductor (Lout1 and Lout2), a main output capacitor (COUT), and a DC blocking capacitor (CDC Block). The basic operation of this topology is to separate the total inductive current into a discontinuous DC component (IL1) and an AC component (IL2). The current IL1 reaches 0 A during each switching cycle, and its average is equal to the DC component of the total inductive current. IL2 carries the AC component of the total inductive current—the average IL2 current is equals to 0 A. The operation of IL2 is accomplished through inductor Lout2 and capacitor CDC Block, which in combination act as a high-pass, high-power filter.

Figure 6:
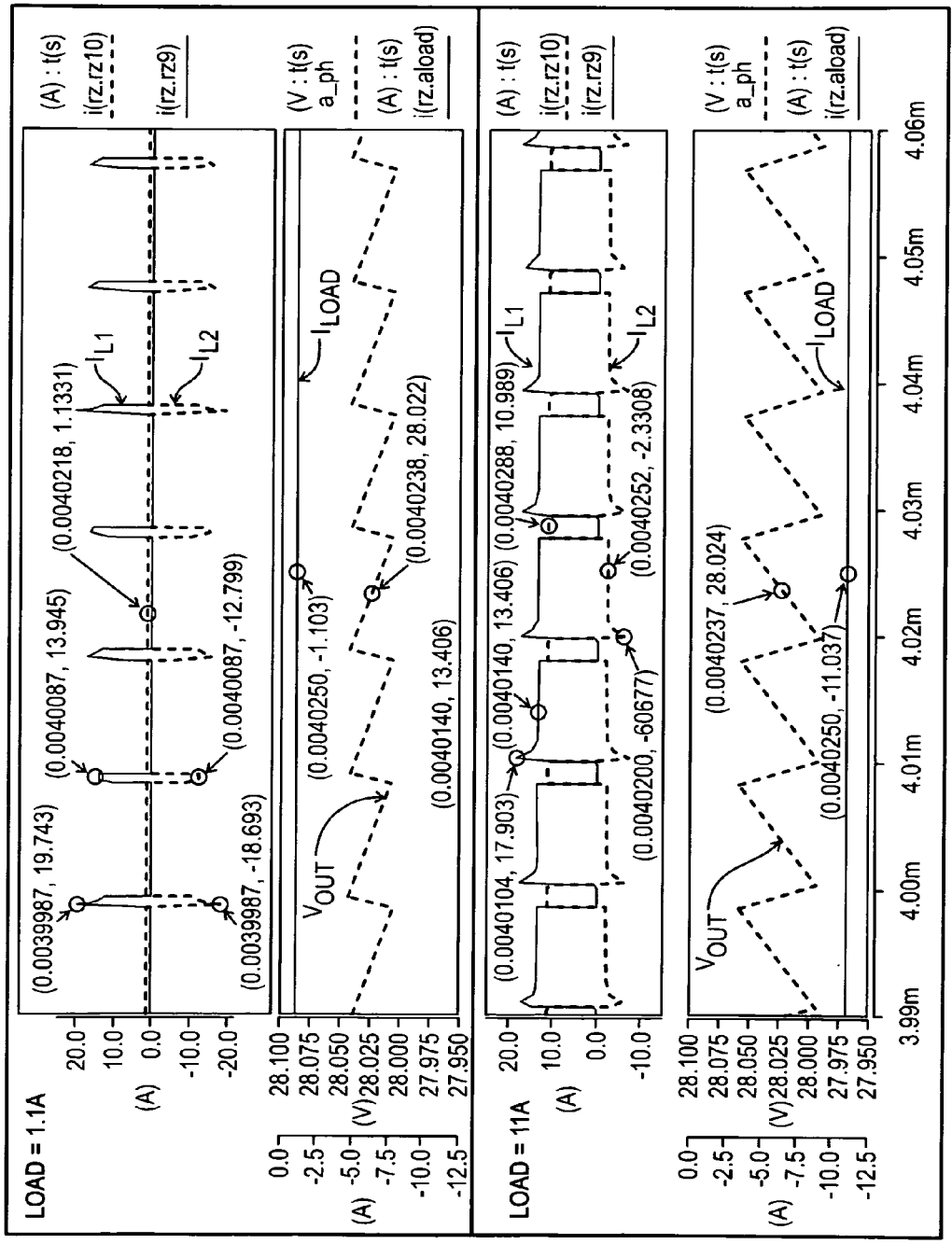
FIG. 6 is a graph of the coupled inductor output filter simulation results for different load conditions.

FIG. 6 shows simulation results of the converter designed under 1.1 A load conditions (top) and 11 A load conditions (bottom). It can be observed that IL1 remains in discontinuous conduction mode even at high loads while IL2 carries the AC component of the total inductive current. The total load current (ILoad) is a low ripple DC current.

Figure 7:
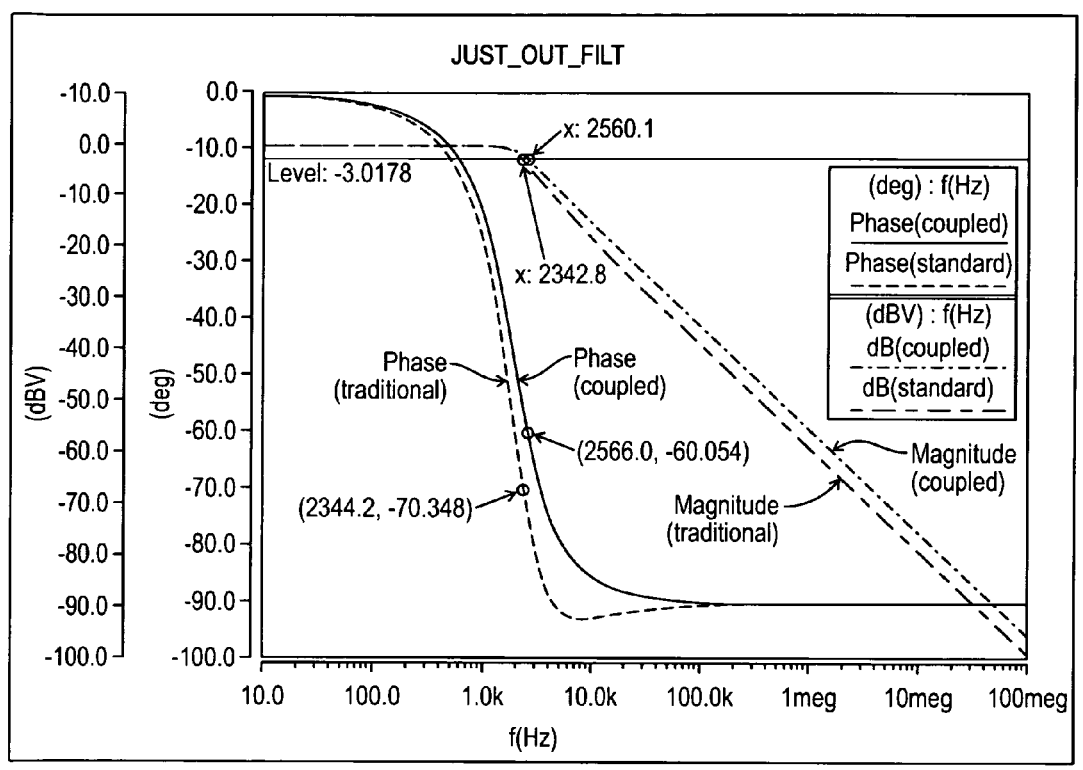
FIG. 7 is a graph of the frequency response comparison of a coupled inductor output filter and standard output filter for Fo≈2.5 kHz (critically damped).

FIG. 7 shows the frequency response of the coupled-inductor filter and the response of an equivalent traditional filter. Notice, the ESR associated with the capacitor CDC Block inserts a zero into the filter's overall response. This is evident by the uniform −20 dB/decade of the coupled-inductor output filter versus initial −40 dB/decade of the traditional filter response (the traditional filter's magnitudes response eventually changes to −20 dB/decade). The insertion of the zero associated with the CDC Block capacitor makes the control loop easier to implement for the coupled-inductor output filter.

Experimental Results

Figure 8:
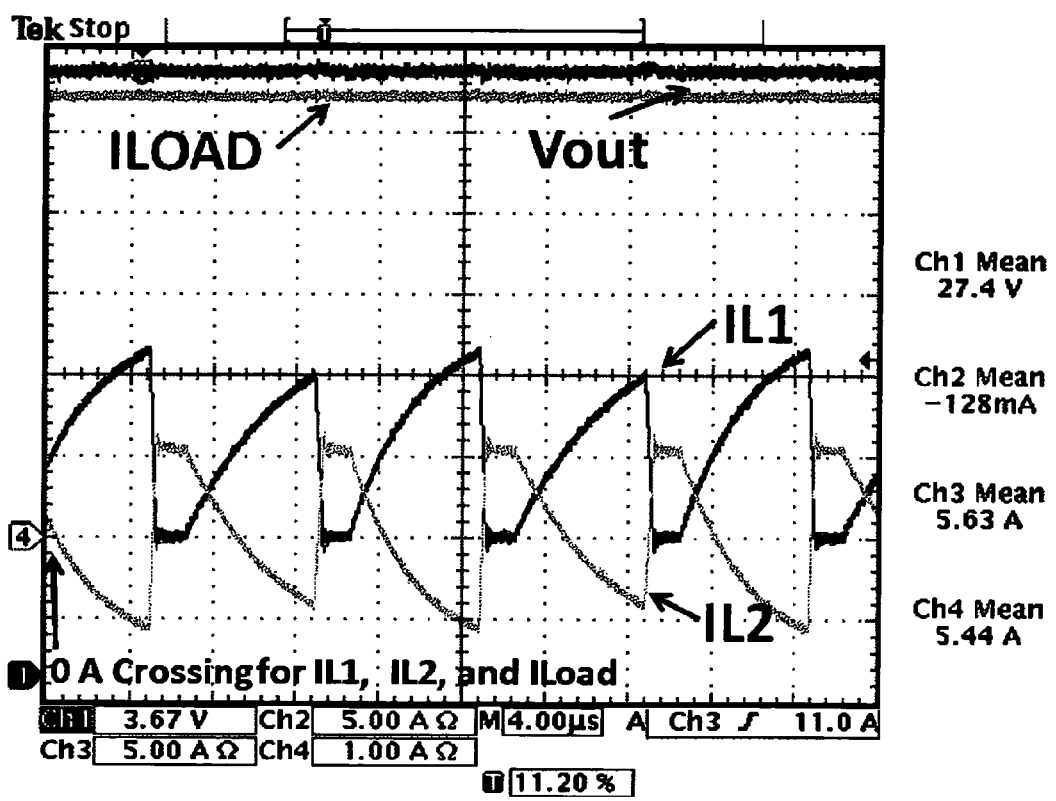
FIG. 8 is a graph of a closed loop standalone operation providing 5.44 A load.
Figure 9:
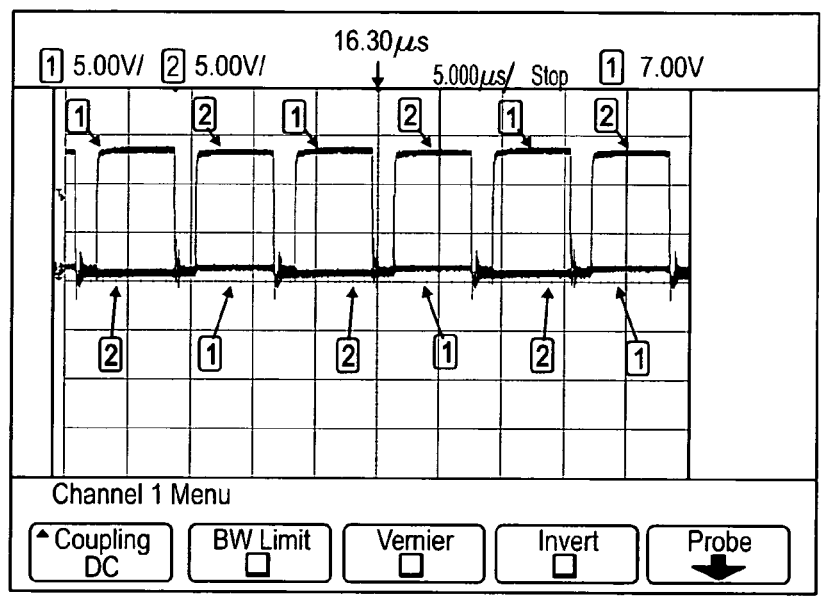
FIG. 9 is a graph of PWM signals for closed loop standalone operation providing 5.44 A load.

DC/DC converter hardware prototypes incorporating the new coupled inductor output filter were built and tested. A power converter implemented with the coupled inductor output filter can be controlled with all the same control methods traditionally used for power converters including voltage and current mode pulse width modulation control schemes. The control scheme used for the experimental results is a variation of a standard voltage control loop with an added term on the feedback loop to correct for the insertion of an extra converter (in the multi-module operation). The following test results show 1) The new coupled-inductor output filter experimental results, 2) Single module standalone operation, and 3) Multi-module operation 1) Coupled-Inductor Output Filter Experimental Results:

The results shown in FIG. 8 and FIG. 9 correspond to a closed loop operation while providing power for a 5.44 A load. It can be observed from FIG. 8 that the converter's controller determines the response of the converter. FIG. 9 shows the PWM control signals produced by the controller to supply this load.

2) Single Module Standalone Operation.

Figure 10:
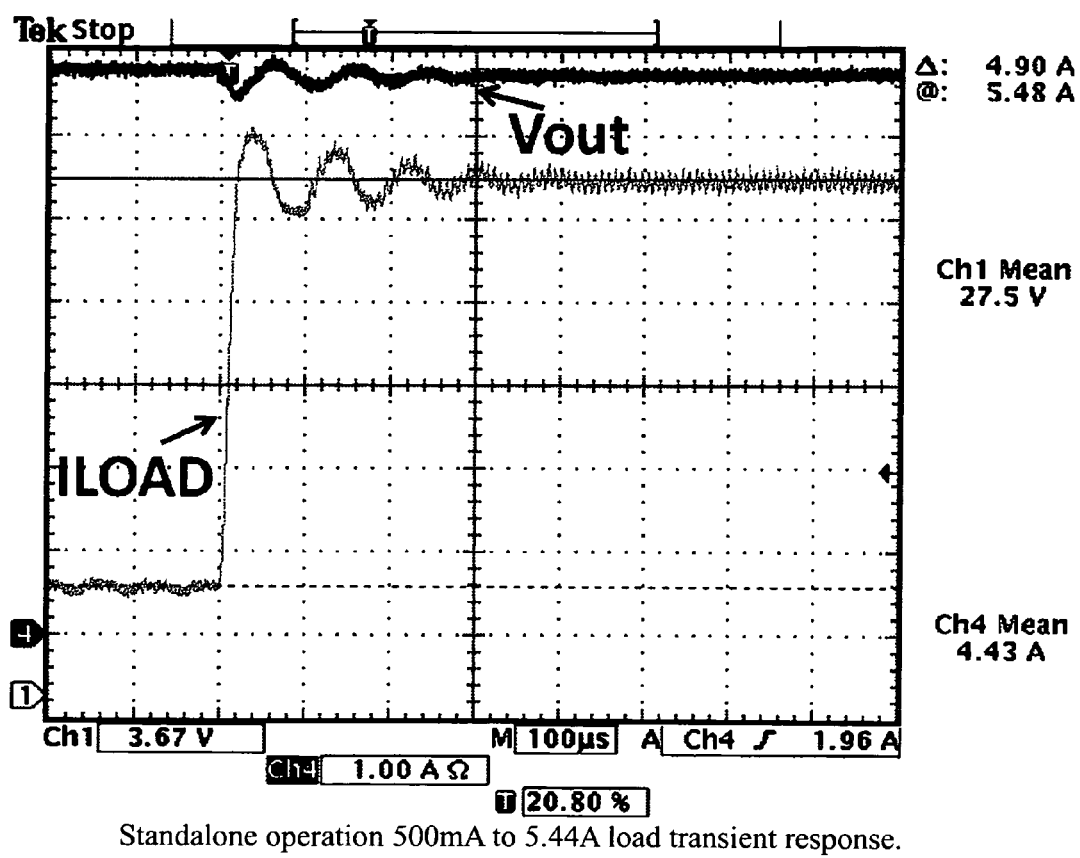
FIG. 10 is a graph of standalone operation 500 mA to 5.44 A load transient response.
Figure 11:
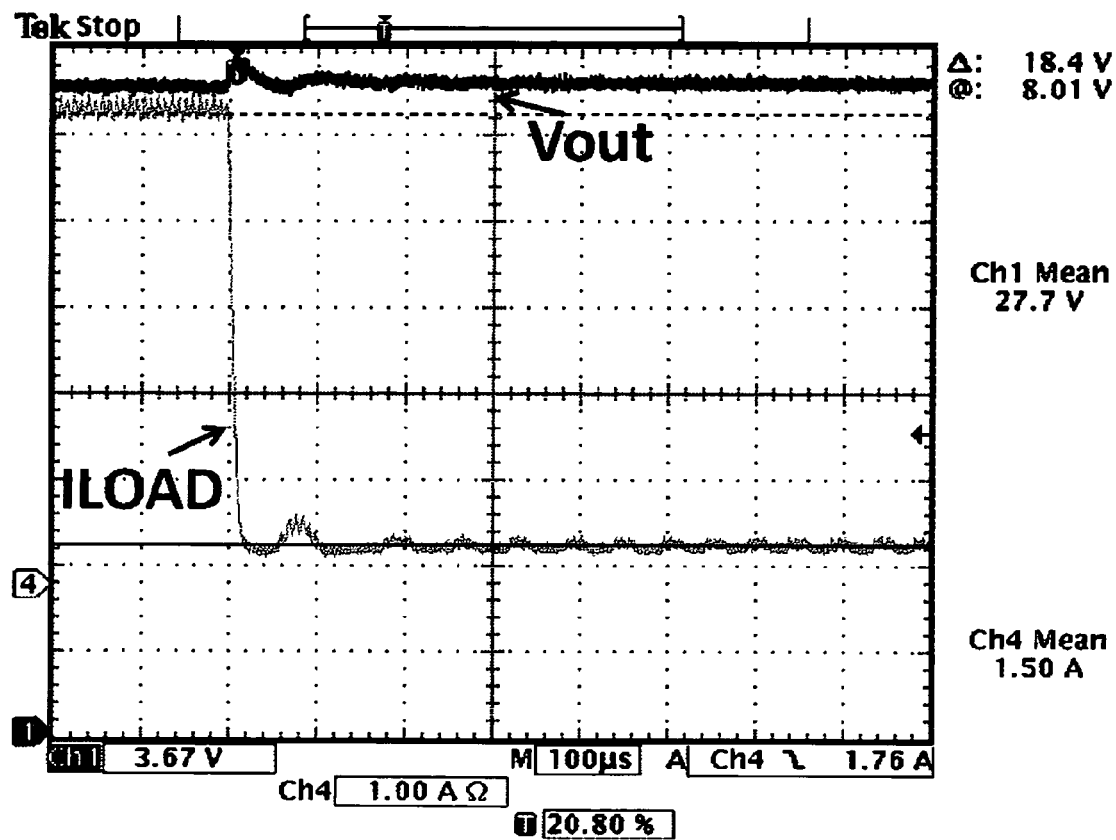
FIG. 11 is a graph of standalone operation 5.44 A to 500 mA load transient response.

The next results show a single converter operating in standalone mode while responding to load transients. FIG. 10 shows the converter's closed loop response to a load transient from 500 mA to 5.44 A. FIG. 11 shows the converter's closed loop response to a load transient from 5.44 A to 500 mA.

3) Multi-Module Operation

Figure 12:
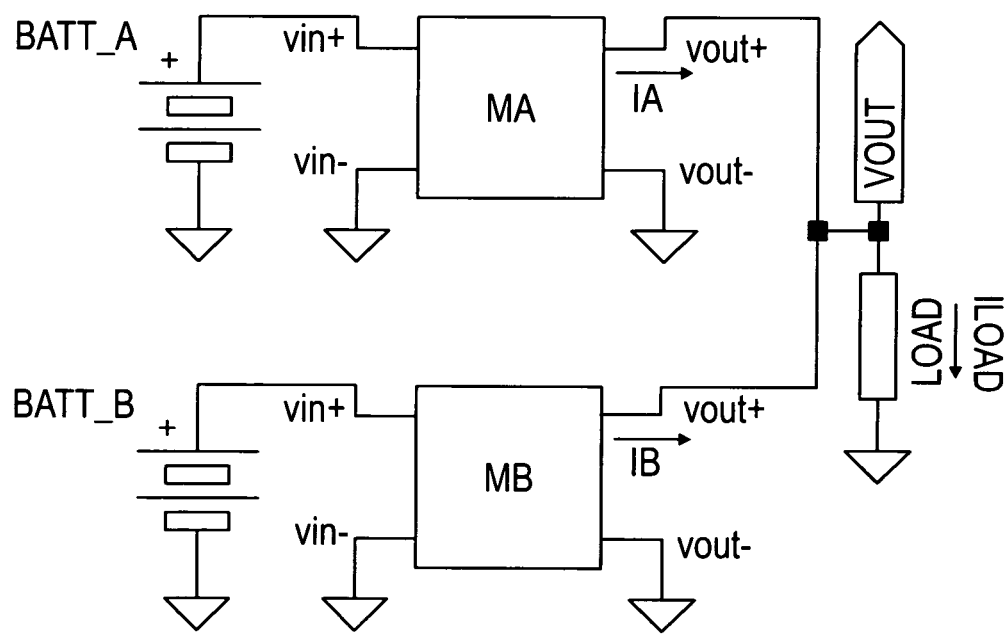
FIG. 12 is a schematic view of a two-module configuration schematic representation.

The modular arrangement in FIG. 12 shows the converters being powered from two different power sources. During actual testing, the power sources used were variable voltage sources employed to emulate different operating conditions.

Figure 13:
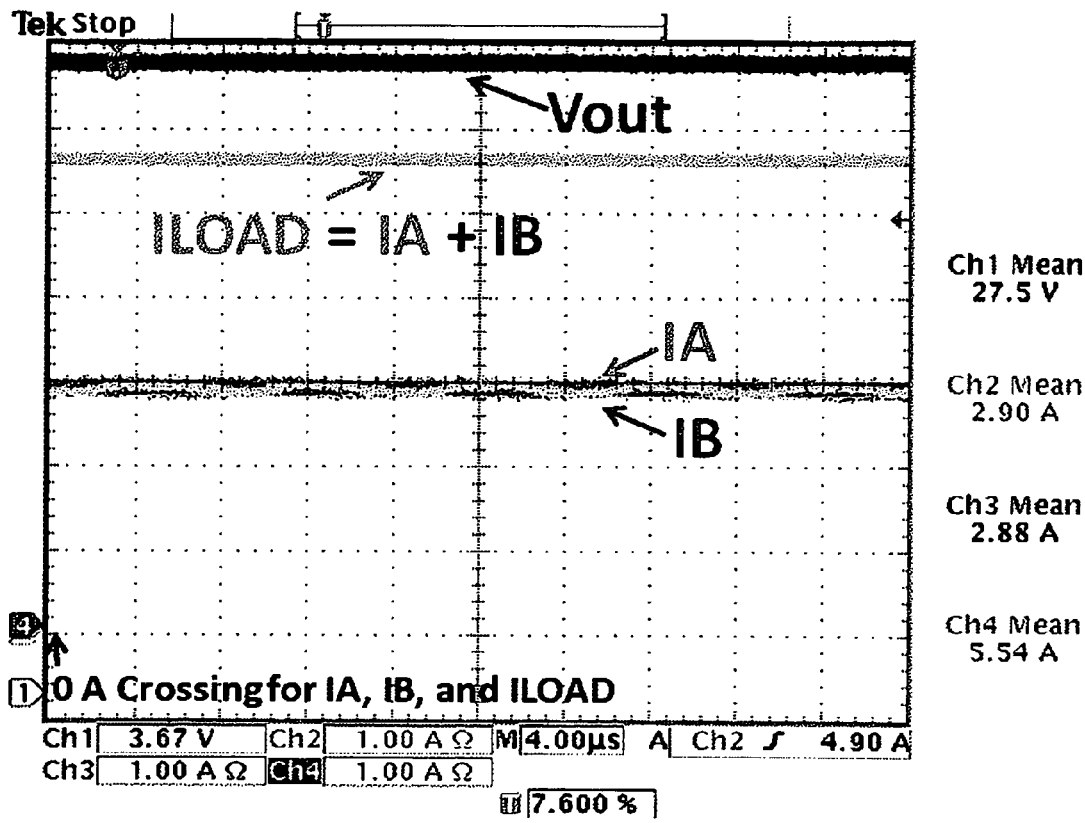
FIG. 13 is a graph of steady state operation of MA and MB connected in parallel at the output with VIN M1=23V and VIN M2=20V.
Figure 14:
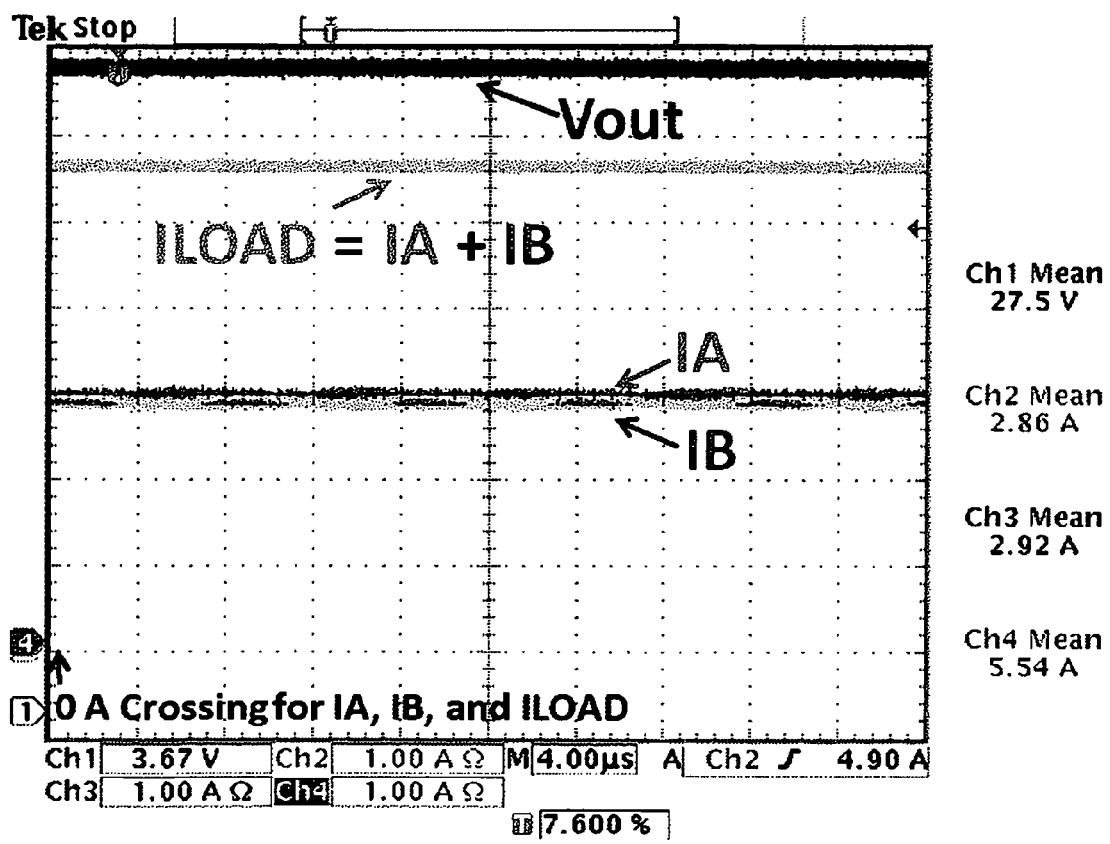
FIG. 14 is a graph of steady state operation of MA and MB connected in parallel at the output with VIN M1=23V and VIN M2=32V.

The first set of multi-module operation experiments were carried out under steady state conditions as shown in FIG. 13 and FIG. 14.

The results of FIG. 13 show the converters sharing output current. In this test, M1 is being powered from 23V and M2 is powered from 20V. FIG. 14 shows the converters proving equally distributed load current while operating from widely different input voltages. For the test results in FIG. 14, M1 is being powered from 23V and M2 is powered from 32V. These results show the ability of the modular converters to share power even when individually functioning under different operating conditions.

Figure 15:
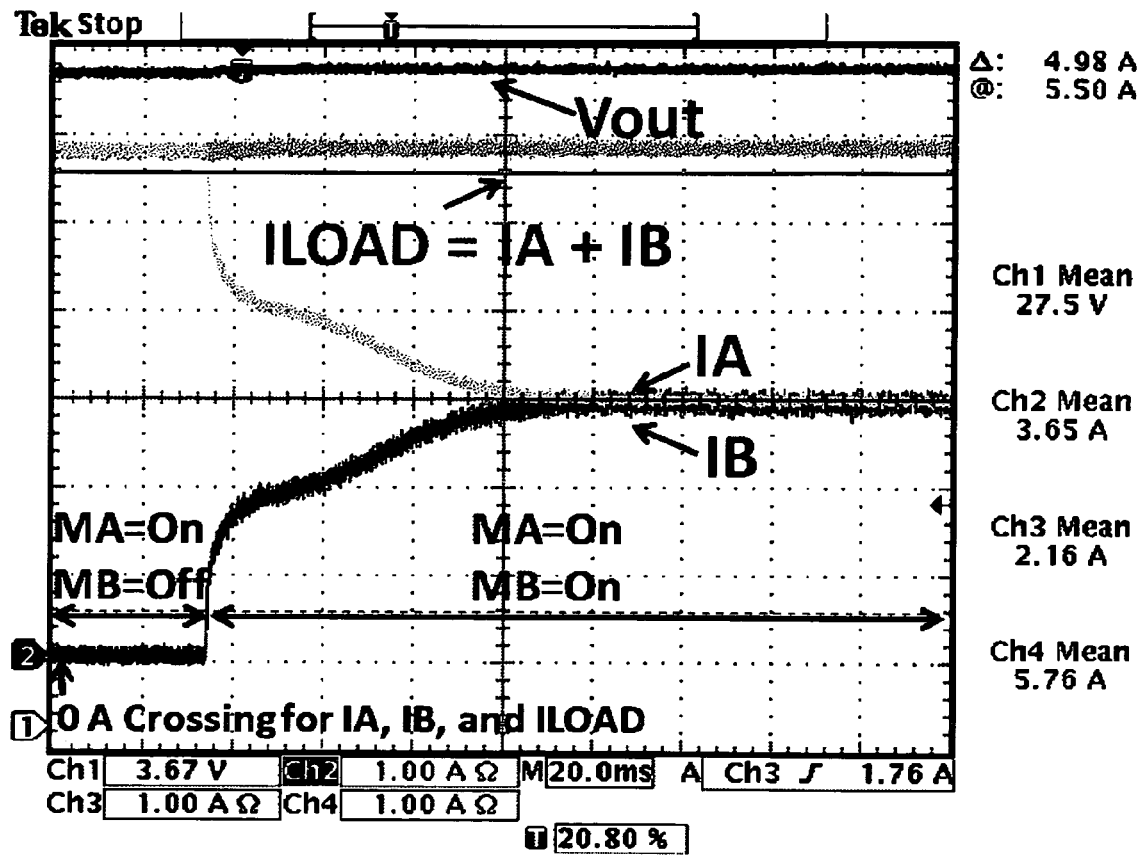
FIG. 15 is a graph of the MA and MB automatic response to an addition of a new module (MB).
Figure 16:
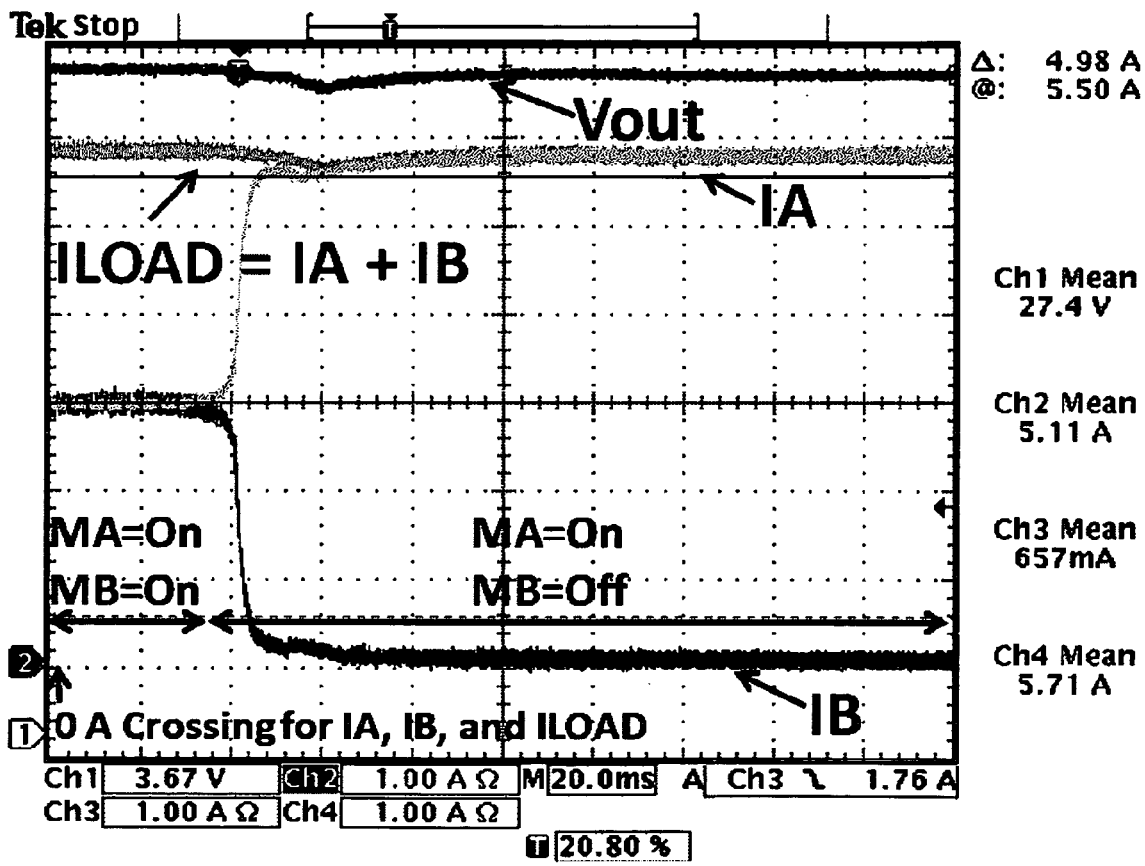
FIG. 16 is a graph of the MA and MB automatic response to the loss of a module (MB).

FIG. 15 and FIG. 16 show the converters' automatic response to each others' presence/absence without the need of any means of communication.

In FIG. 15, MA is providing all the power while MB is inactive (input voltage is 0V). Eventually MB is powered on and MA responds accordingly. The result shown in FIG. 15 demonstrates the ability of each individual module's self-contained modular controller to sense when an additional module is brought online.

In FIG. 16, both MA and MB are equally providing the total power (equally distributed individual currents). Eventually MB is turned off (input voltage brought down to 0V). MA senses the absence of MB as an increase in required output current. The self-contained modular controller detects and compensates for the absence of MB.

Unlike most traditional DC/DC converter paralleling techniques, which rely mostly on complex control algorithms and communication schemes, the modular converters developed are based on an inherently power sharing topology. The key enabling technology for truly modular operation is the introduction of the coupled-inductor output filter topology.

From the foregoing, it will be seen that this invention well adapted to obtain all the ends and objects herein set forth, together with other advantages which are inherent to the structure. It will also be understood that certain features and sub combinations are of utility and may be employed without reference to other features and sub combinations. This is contemplated by and is within the scope of the claims. Many possible embodiments may be made of the invention without departing from the scope thereof. Therefore, it is to be understood that all matter herein set forth or shown in the accompanying drawings is to be interpreted as illustrative and not in a limiting sense.

When interpreting the claims of this application, method claims may be recognized by the explicit use of the word 'method' in the preamble of the claims and the use of the 'ing' tense of the active word. Method claims should not be interpreted to have particular steps in a particular order unless the claim element specifically refers to a previous element, a previous action, or the result of a previous action. Apparatus claims may be recognized by the use of the word 'apparatus' in the preamble of the claim and should not be interpreted to have 'means plus function language' unless the word 'means' is specifically used in the claim element. The words 'defining,' 'having,' or 'including' should be interpreted as open ended claim language that allows additional elements or structures. Finally, where the claims recite "a" or "a first" element of the equivalent thereof, such claims should be understood to include incorporation of one or more such elements, neither requiring nor excluding two or more such elements.

What is claimed is:

1. A coupled inductor output filter for one or more DC/DC switched mode power supplies with a power output for powering a load with a first load end and a second load end, the filter comprising:
   a coupled inductor including a first inductor coupled to a second inductor;
   the first inductor connected between the power output and the load;
   a first capacitor connected in parallel with the load;
   the second inductor connected in series with a second capacitor to form an inductor capacitor series; and
   the inductor capacitor series connected in parallel with the load.

2. A method of filtering load power requirements for a load supplied by at least one DC power supply, the method comprising:
   providing a coupled inductor including a first inductor and a second inductor;
   connecting the first inductor in series with the load;
   using the second inductor in series with a capacitor to form a high pass filter; and
   connecting the high pass filter in parallel with the load such that the coupling of the inductors causes the first inductor to operate in a discontinuous mode.

* * * * *